A. Brear,
Wild-Fowl Trap.
N°50,953.  Patented Nov. 27, 1866.
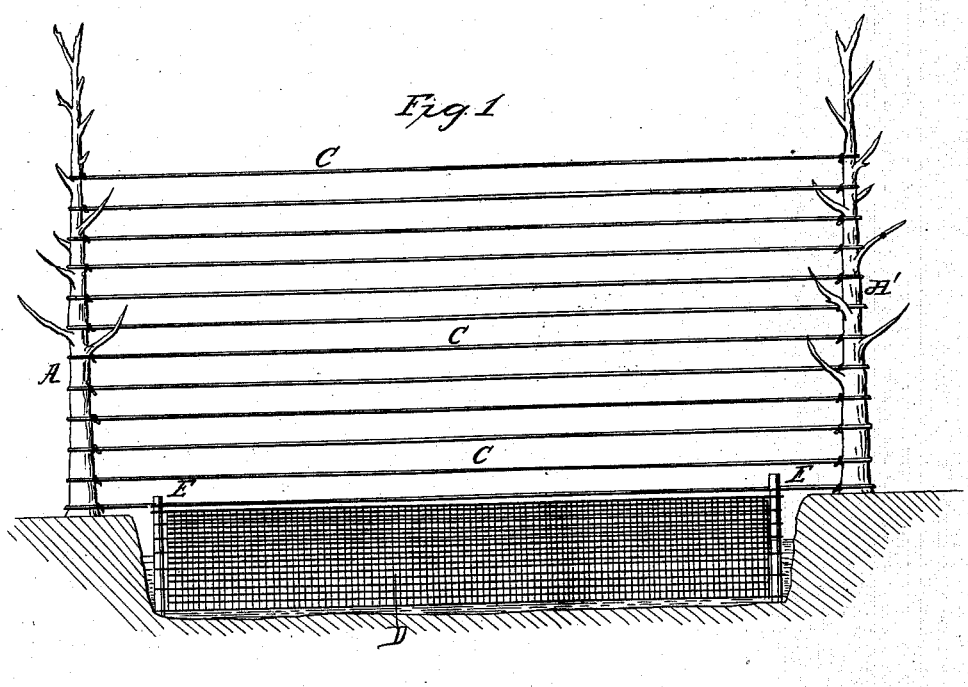
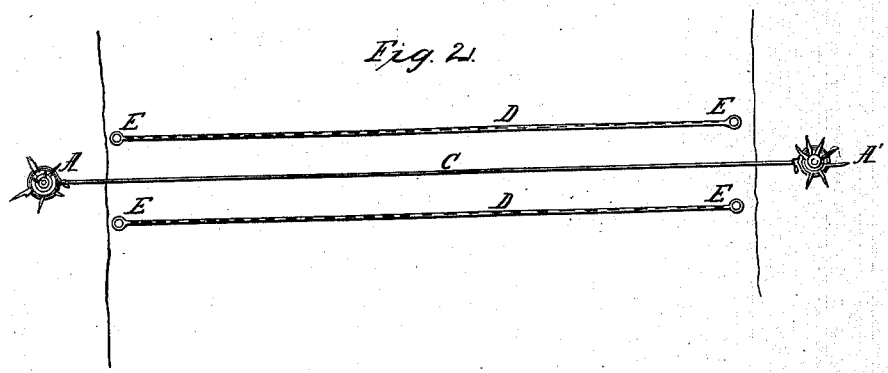
Witnesses:  Inventor:

United States Patent Office.

IMPROVEMENT IN TRAPPING WILD FOWL.

ABEL BREAR, OF SAUGATUCK, CONNECTICUT.

Letters Patent No. 59,953, dated November 27, 1866.

SPECIFICATION.

TO ALL WHOM IT MAY CONCERN:

Be it known that I, ABEL BREAR, of Saugatuck, in the county of Fairfield, and State of Connecticut, have invented a new and improved Game Trap; and I do hereby declare that the following is a full, clear, and exact description of the same, reference being had to the accompanying drawing, which forms part of this specification.

Many species of game, such as ducks, partridges, woodcock, quail, etc., are accustomed to fly in certain places; for instance, ducks are in the habit of flying in a straight course over a creek or sheet of water, from one to ten feet above its surface, and, during the day, they generally fly rapidly over the same course in the morning and evening, if not oftener; partridges and quails direct their course through cleared passages in the woods; and woodcock around the outskirts of the thicket. The object of my invention is to construct a trap across the path of the game, in such manner as to be comparatively undiscernible to the birds as they rush toward it, and yet have the effect of killing or disabling them.

The accompanying drawing illustrates my invention.

Figure 1 being a side elevation of the trap; and

Figure 2 is a plan or top view, showing nets stretched across the river on both sides of the trap.

A A' designate two posts or supports, that, A, being located on one bank of a sheet of water, and that, A', on the opposite bank. Any object in nature, suitable for the purpose, that the place affords where the trap is to be set, may be employed for supports, such as trees growing sufficiently in line for the purpose. C C designate that part of the trap which I term the "stretchers." In the present instance they are of wire, but may be of cord or any other suitable material. The wires, C, are secured at one of their ends to the support or post, A, and at the other to that, A', so as to stretch in horizontal (or nearly so) lines across the space between the supports. It would be well to have the lowest stretcher, C, about a foot from the surface of the water, if the trap is to be set over such place, and the highest one about eighteen feet above the same. This size of trap would, in ordinary cases, be sufficient for catching ducks and other game flying along the water. But I will remark, that the size of the trap and the distance apart of the stretchers should be regulated according to the habits of flight and size of the game for which the trap is set. In practice I have found that if the stretchers be placed nine inches apart the trap answers well for duck and partridges; if placed four inches apart, for woodcock and quail. I have noticed that the birds above mentioned fly with great speed when going to and from "feed," as it is called, and in the same course daily; they come upon the trap, which they do not observe, and strike it with such force as, in the majority of cases, to kill them instantly, and in other cases to disable them so that their escape is quite impossible. I have noticed, also, that after striking the trap the momentum of the bird's body usually carries it tail foremost through an intervening space of the stretchers. D D represent nets which are stretched across the water at a proper distance above and below the trap, in such manner as to prevent the game, whether killed or wounded, from escaping either up or down the sheet of water. These nets may be located as occasion may suggest, and either one or two might be used, or the net may completely surround the trap; the latter would be advantageous on the land. The net acts as a fence around the trap to prevent the wounded game from escaping, and the killed from being carried away with the tide, and it may be secured in position in any suitable way. I have shown two seine-like nets attached to posts, E E, on each side of the trap. Instead of arranging the stretchers in a horizontal line, they may be otherwise arranged, vertically for instance, in which latter case inclined or horizontal strips may be used at top and bottom, and the stretchers secured at their respective ends to them. So also may the stretchers be arranged in a manner to break spaces, that is, two stretchers may be placed at a certain distance apart, and another stretcher in advance of these, at, say, about half way of the distance between them. This trap is equally as useful on the land as on the water, and in such cases it can be set across the places or in the course where the game is in the habit of flying.

What I claim as my invention, and desire to secure by Letters Patent, is—

1. The combination, to form a game trap, of supports and stretchers, constructed, arranged, and operating substantially as herein specified.

2. The combination with such trap of a net D, one or more, substantially as and for the purpose specified.

A. BREAR.

Witnesses:
M. M. LIVINGSTON,
JAS. BUTLER.